US012579267B2

(12) United States Patent
D'Elia et al.

(10) Patent No.: US 12,579,267 B2
(45) Date of Patent: Mar. 17, 2026

(54) METHODS AND SYSTEMS FOR ANALYZING ENVIRONMENT-SENSITIVE MALWARE WITH COVERAGE-GUIDED FUZZING

(71) Applicants: PRISMA S.R.L., Rome (IT); Daniele Cono D'Elia, Teggiano (IT)

(72) Inventors: Daniele Cono D'Elia, Teggiano (IT); Nicola Bottura, Gonzaga (IT)

(73) Assignees: Daniele Cono D'Elia, Teggiano (IT); PRISMA S.R.L., Rome (IT)

( * ) Notice: Subject to any disclaimer, the term of this patent is extended or adjusted under 35 U.S.C. 154(b) by 181 days.

(21) Appl. No.: 18/224,628

(22) Filed: Jul. 21, 2023

(65) Prior Publication Data

US 2024/0045961 A1 Feb. 8, 2024

(30) Foreign Application Priority Data

Jul. 28, 2022 (IT) ........................ 102022000015966

(51) Int. Cl.
*G06F 21/56* (2013.01)
*G06F 21/54* (2013.01)
*G06F 21/55* (2013.01)

(52) U.S. Cl.
CPC ............ *G06F 21/566* (2013.01); *G06F 21/54* (2013.01); *G06F 21/554* (2013.01)

(58) Field of Classification Search
CPC ...... G06F 21/566; G06F 21/54; G06F 21/554; G06F 21/53; G06F 2221/033; H04L 63/1416; H04L 63/145; H04L 63/1433
See application file for complete search history.

(56) References Cited

U.S. PATENT DOCUMENTS

| | | | |
|---|---|---|---|
| 9,361,459 | B2 | 6/2016 | Kolbitsch et al. |
| 9,900,324 | B1 | 2/2018 | Barua et al. |
| 10,311,235 | B2 | 6/2019 | Bobritsky et al. |
| 10,546,128 | B2 | 1/2020 | Gu et al. |
| 10,735,441 | B2 | 8/2020 | Anderson et al. |
| 10,747,872 | B1 | 8/2020 | Ha et al. |

(Continued)

OTHER PUBLICATIONS

Fuzzingbook 2022, The Fuzzing Book. 2022 edition, CISPA Helmholtz Center for Information Security.

(Continued)

*Primary Examiner* — Wasika Nipa
*Assistant Examiner* — Edgar W Xie
(74) *Attorney, Agent, or Firm* — ArentFox Schiff LLP; Michael Fainberg

(57) ABSTRACT

The present invention concerns methods and systems for analyzing a software program as a potential environment-sensitive malware sample. The methods and systems described here may comprise monitoring access to environmental information, altering according to an execution policy the contents of environmental information items before retrieval by the program, recording as coverage information the internal states and the externally observable actions from the program execution, using recoded coverage information to generate in a fuzzing fashion execution policies with new contents for environmental information items, and identifying execution policies that induce previously unseen internal states and externally observable actions for the program.

13 Claims, 3 Drawing Sheets

(56) References Cited

U.S. PATENT DOCUMENTS

| | | | | |
|---|---|---|---|---|
| 2014/0317745 | A1* | 10/2014 | Kolbitsch | G06F 21/566 |
| | | | | 726/24 |
| 2015/0007325 | A1* | 1/2015 | Eliseev | G06F 21/566 |
| | | | | 726/24 |
| 2016/0259939 | A1 | 9/2016 | Bobritsky et al. | |
| 2021/0211438 | A1 | 7/2021 | Trim et al. | |
| 2021/0374241 | A1 | 12/2021 | Parikh et al. | |
| 2023/0281322 | A1* | 9/2023 | Powers | G06F 21/577 |
| | | | | 726/25 |

OTHER PUBLICATIONS

Banescu et al., Chapter Five—a Tutorial on Software Obfuscation, Advances in Computers, 2018, pp. 283-353, vol. 108, Elsevier.

Lengyel et al., Scalability, fidelity and stealth in the DRAKVUF dynamic malware analysis system, ACSAC '14: Proceedings of the 30th Annual Computer Security Applications Conference, Dec. 2014, pp. 386-395, ACM.

Oyama Y., How does Malware Use RDTSC? A Study on Operations Executed by Malware with CPU Cycle Measurement, in Detection of Intrusions and Malware, and Vulnerability Assessment, 16th International Conference, DIMVA 2019, Gothenburg, Sweden, Jun. 19-20, 2019, Proceedings, pp. 197-218, Springer.

Xu et al., GoldenEye: Efficiently and Effectively Unveiling Malware's Targeted Environment, in Research in Attacks, Intrusions and Defenses, 17th International Symposium, RAID 2014, Gothenburg, Sweden, Sep. 17-19, 2014, Proceedings, pp. 22-45, Springer.

Aschermann et al., REDQUEEN: Fuzzing with Input-to-State Correspondence, Network and Distributed Systems Security (NDSS), Symposium 2019, Feb. 24-27, 2019, pp. 1-15, San Diego, CA, US, Internet Society.

Baldoni et al., A Survey of Symbolic Execution Techniques, ACM Computing Surveys, published online May 23, 2018, pp. 1-39, Article No. 50, vol. 51, Issue 3, ACM Journals.

Brengel et al., Detecting Hardware-Assisted Virtualization, in Detection of Intrusions and Malware, and Vulnerability Assessment, 13th International Conference DIMVA 2016, San Sebastian, Spain, Jul. 7-8, 2016, Proceedings, pp. 16-27, Springer.

Cavallaro et al., On the Limits of Information Flow Techniques for Malware Analysis and Containment, in Detection of Intrusions and Malware, and Vulnerability Assessment, 5th International Conference, DIMVA 2008, Paris, France, Jul. 10-11, 2008, pp. 143-163, Springer.

D'Elia et al., On the Dissection of Evasive Malware, IEEE Transactions on Information Forensics and Security, 2020, pp. 2750-2765, vol. 15, IEEE.

Dinaburg et al., Ether: malware analysis via hardware virtualization extensions, CCS '08: Proceedings of the 15th ACM conference on Computer and communications security, Oct. 2008, pp. 51-62, ACM.

Garfinkel et al., Compatibility is not transparency: VMM detection myths and realities, Proceedings of HOTOS'07: 11th 11th Workshop on Hot Topics in Operating Systems, May 7-9, 2005, San Diego, CA, US, 2007, Article No. 6, pp. 1-6, Usenix Association.

Jung et al., Winnie: Fuzzing Windows Applications with Harness Synthesis and Fast Cloning, Network and Distributed Systems Security (NDSS) Symposium 2021, Feb. 21-25, 2021, Internet Society.

Maffia et al., Longitudinal Study of the Prevalence of Malware Evasive Techniques, Dec. 21, 2021, arXiv technical report https://arxiv.org/abs/2112.11289.

Ollivier et al., How to Kill Symbolic Deobfuscation for Free (or: Unleashing the Potential of Path-Oriented Protections), ACSAC '19: Dec. 9-13, 2019, San Juan, PR, US, pp. 177-189, ACM.

Pham et al., Smart Greybox Fuzzing, Transactions on Software Engineering, 2019, pp. 1980-1997, vol. 47, Issue 9, IEEE.

Polino et al., Measuring and Defeating Anti-Instrumentation-Equipped Malware, in Detection of Intrusions and Malware, and Vulnerability Assessment, 14th International Conference, DIMVA 2017, Bonn, Germany, Jul. 6-7, 2017, Proceedings, pp. 73-96, Springer.

Sentinelone, SFG: Furtim Malware Analysis. https://www.sentinelone.com/blog/sfg-furtims-parent/.

Peng et al., X-Force: Force-Executing Binary Programs for Security Applications, Proceedings of the 2014 USENIX Security symposium, pp. 829-844, USENIX Association.

* cited by examiner

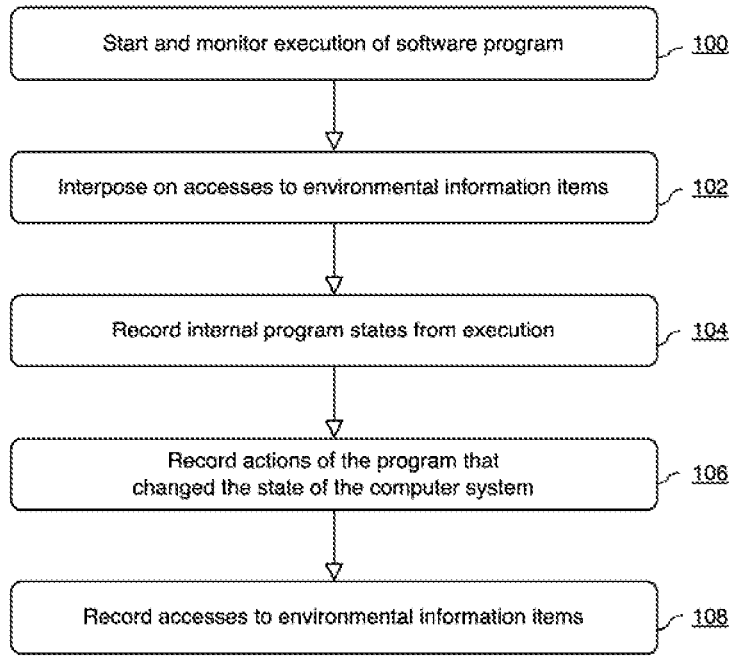

Start and monitor execution of software program — 100

Interpose on accesses to environmental information items — 102

Record internal program states from execution — 104

Record actions of the program that changed the state of the computer system — 106

Record accesses to environmental information items — 108

Fig. 1

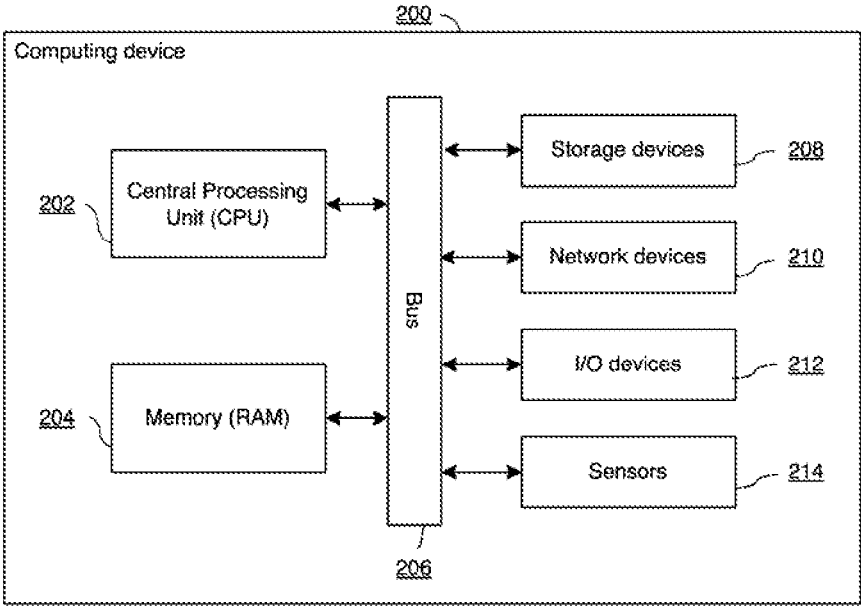

200

Computing device

202 — Central Processing Unit (CPU)

204 — Memory (RAM)

206 — Bus

208 — Storage devices

210 — Network devices

212 — I/O devices

214 — Sensors

Fig. 2

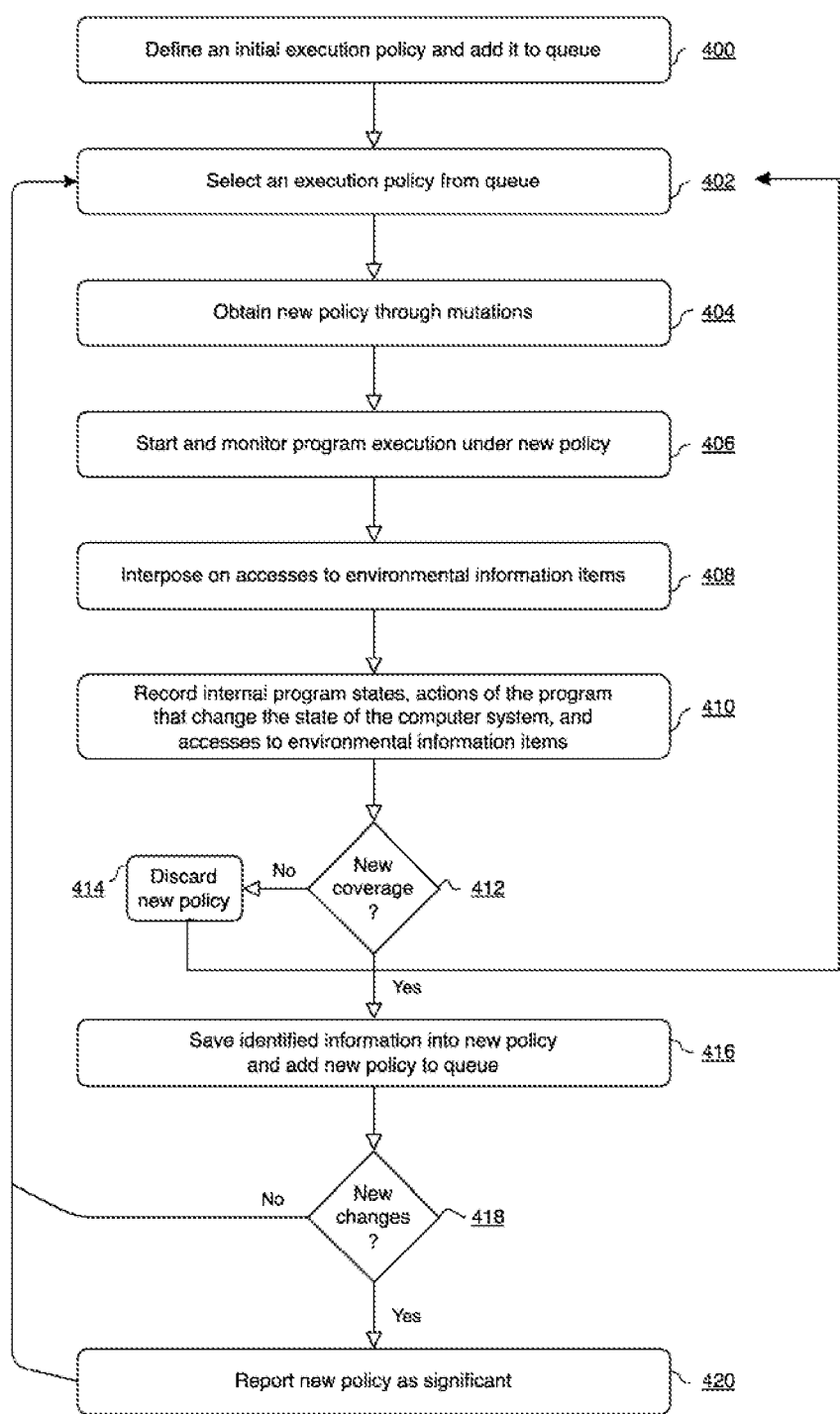

Define an initial execution policy and add it to queue — 400

Select an execution policy from queue — 402

Obtain new policy through mutations — 404

Start and monitor program execution under new policy — 406

Interpose on accesses to environmental information items — 408

Record internal program states, actions of the program that change the state of the computer system, and accesses to environmental information items — 410

New coverage? — 412

No → Discard new policy — 414

Yes

Save identified information into new policy and add new policy to queue — 416

New changes? — 418

No

Yes

Report new policy as significant — 420

Fig. 4

METHODS AND SYSTEMS FOR ANALYZING ENVIRONMENT-SENSITIVE MALWARE WITH COVERAGE-GUIDED FUZZING

CROSS-REFERENCE TO RELATED APPLICATION

This application claims priority to and benefit of Italian Patent Application No. 102022000015966 filed Jul. 28, 2022, the contents of which are incorporated by reference in their entirety.

FIELD OF THE INVENTION

The present invention concerns methods and systems for analyzing environment-sensitive malware with coverage-guided fuzzing.

The present disclosure covers the area of computer security. In some embodiments thereof, the present invention relates to methods and systems for analyzing malicious software and, more specifically, but not exclusively, for analyzing environment-sensitive software, in particular malware.

BACKGROUND OF THE INVENTION

Security professionals rely on analysis environments, such as malware sandboxes, to monitor in a controlled, safe environment an untrusted program that may carry malicious activities. The output of such analyses, among others, helps professionals build signatures for future detection of similar threats and write detailed reports for threat intelligence activities. However, malware may be equipped with logic to fingerprint the current execution environment and decide whether to execute its malicious logic accordingly. Most prominently, evasive malware looks for distinctive features and artifacts of analysis environments to avoid detection, resorting to an ever-evolving plethora of evasion techniques. Recent studies show that a fraction as large as 40% of malware observed in 2020 resorts to evasive techniques, in comparison with about 30% in 2016 [Maffia et al., 2021]. Similarly, targeted malware is a class of malware destined for a specific organization or industry that, before executing its malicious logic, checks whether peculiar characteristics of the machines in use to the intended victims are met.

Malware includes, but is not limited to, adware, keyloggers, ransomware, rootkits, spyware, trojans, and worms. In some instances, malware may behave differently from its intended goal when specific environmental conditions are not met. In some instances, so-called evasive malware may react to the presence of a malware analysis system. For example, evasive malware may behave in an apparently benign manner, it may stall its execution until the analysis system ends its work, or it may terminate its execution prematurely. In some instances, so-called targeted malware may react to characteristics or execution conditions of the machine that differ from those typical of its intended victims. For example, malware written for industrial espionage may show a different behavior when executing on a machine with a keyboard layout different than the one expected to be in use on the machines of the designated victim organization.

Malware authors resort to increasingly sophisticated techniques to fingerprint the characteristics of the execution environment and act upon the retrieved information. These techniques lead automated analysis systems to produce inconclusive, inaccurate, or misleading results, requiring manual intervention of trained security professionals to dissect the code and the behavior of a malware sample, understand the techniques it uses, and devise solutions to get around them.

Examples of specific fingerprinting techniques in use to malware include, but are not limited to, the ones below. The examples are provided for illustrative purposes only and are not intended to be necessarily limiting. In some instances, malware looks for characteristics of the environment that are typical of virtualized environments, since a large variety of malware analysis systems operate inside virtual machines. Examples of such environment characteristics include the presence of specific hardware features (for example, strings related to BIOS, firmware, and CPU feature characteristics), drivers, files, and processes typical of common hypervisors such as Oracle VirtualBox, VMware, Microsoft Hyper-V, and Xen. In some instances, malware looks for particular features of known malware analysis systems. Examples of such features include the presence of specific files and processes typical of a sandbox solution such as Cuckoo Sandbox, Sandboxie, and others. In some instances, malware may attempt evasions based on time measurements or on stalling sequences. For instance, malware may measure the time required to complete a specific operation to check that it is not above a precomputed threshold, which would be indicative of a slowdown induced by the analysis system or by the execution being carried in a hypervisor or software emulator. Examples of stalling sequences include performing multiple sleep operations that cumulatively account for a predefined amount of time and optionally verifying, for instance through time measurements, that the execution has been stalled for no less than the expected amount of time, and therefore was not artificially accelerated by an analysis system for the sake of speed.

In general, fingerprinting techniques are characterized by the access from malware to one or more items of environmental information. The code that processes the contents of the accessed information can be of arbitrary complexity. In some instances, malware acts upon the retrieved information only long after the query, typically to conceal any temporal connection between the environmental information access and the actions from its environment-dependent logic. In some instances, malware processes the retrieved information by means of obfuscated code constructs (for example, with the addition of opaque predicates, [Banescu et al. 2018]) and patterns that break well-known code analyses (for example, implicit flows to break taint analysis [Cavallaro et al. 2008]). In some instances, malware builds an opaque summary of multiple retrieved environmental information items and acts upon the value of the summary, so as not to provide any clue on which of the probed environmental information items did not meet the expectations of the malware. In some instances, when an environment-sensitive decision has been taken, malware may access further environmental information items without acting upon them for the purpose of deflecting the focus of an analysis system or of a human operator from previously accessed information, which is instead behind the ongoing execution behavior. All these techniques, along with similar variants or combinations that were not discussed for brevity, further marginalize the techniques currently available for the analysis of environment-sensitive malware as detailed next.

Current approaches to the analysis of environment-sensitive malware can be generally divided in two kinds: approaches that build increasingly transparent analysis environments, so as to defeat common fingerprinting techniques typical of evasive malware, and approaches that study how the instructions of a program under analysis act on the contents of retrieved environmental information items (typically, by analyzing conditional branch instructions in the program) and consequently try to alter the computer system or the code of the program to force a different outcome for program decisions. In general, a solution of either said kind relies on an interposition means (interposition being standard concept in the field, wherein corresponding means are used), also termed "instrumentation" or "hooking" in much literature, to intercept (and, when needed, alter the natural course of) operations such as system calls that a program makes to the operating system or the occurrence of (all or some) program instructions. In general, existing solutions following either said kind may be limited in the types of fingerprinting techniques and decision logics that they can handle, may require manual extensions to handle new techniques, may face scalability issues, or may be circumvented through the use of well-known code constructs with anti-analysis effects. For example, the increased transparency of systems based on virtual machine introspection such as Ether [Dinaburg et al. 2008] and DRAKVUF [Lengyel et al. 2014] is defeated by timing-based attacks that reveal microarchitectural effects from the underlying hypervisor required by their design [Brengel et al. 2016]; furthermore, systems of this kind do not have provisions for targeted malware, which typically includes fingerprinting actions for peculiar characteristics of the machines in use to the intended victims that are unrelated to the transparency of the analysis. For example, systems such as Arancino [Polino et al. 2017] and BluePill [D'Elia et al. 2020] that, by providing predetermined false responses to a predetermined selection of fingerprinting actions, actively hide artifacts targeted in known evasive techniques, require frequent expensive updates to cope with the continuous evolution of evasion techniques; furthermore, systems of this kind do not have provisions for targeted malware, as the peculiar machine characteristics to be met cannot be expressed as predetermined false responses since these may vary depending on the intended victims. For example, malware analysis methods based on symbolic execution (for example, using capabilities provided by symbolic execution engines such as angr, BINSEC/SE, EXE, Mayhem, and S2E) face scalability issues due to well-known problems such as path explosion issues and formulas for path conditions that are too complex to solve in bounded time [Baldoni et al. 2018]. Malware writers can further marginalize these systems by employing, for instance, constructs that artificially increase the number of paths to explore and cannot be detected and simplified away by a symbolic execution engine [Ollivier et al. 2019]. Similarly, malware writers can use anti-taint analysis techniques [Cavallaro et al. 2008], such as implicit flows, to marginalize malware analysis systems such as GoldenEye [Xu et al. 2014] that use taint analysis for dependency analysis.

Document [1] U.S. Pat. No. 9,361,459 B2 is directed to methods and systems for malware detection based on environment-dependent behavior. Generally, an analysis environment is used to determine how input collected from an execution environment is used by suspicious software. The methods and systems described identify use of environmental information to decide between execution paths leading to malicious behavior or benign activity. In one aspect, one embodiment of the invention relates to a method comprising monitoring execution of suspect computer instructions; recognizing access by the instructions of an item of environmental information; identifying a plurality of execution paths in the instructions dependent on a branch in the instructions based on a value of the accessed item of environmental information; and determining that a first execution path results in benign behavior and that a second execution path results in malicious behavior. The disclosed method comprises classifying the computer instructions as evasive malware responsive to the determination. This approach has the disadvantage of requiring an identification of the dependencies between item values, branch instructions, and resulting execution paths. Malware writers can use, for example, adversarial techniques such as opaque predicates, mixed boolean-arithmetic expressions, implicit flows, and other obfuscation methods [Banescu et al. 2018, Cavallaro et al. 2008] that disrupt the work of static and dynamic code analyses (such as symbolic execution, taint analysis, and program slicing) currently available to identify such dependencies and/or that artificially induce an exponential amount of resulting execution paths, making their analysis impractical.

Document [2] (U.S. Pat. No. 9,900,324 B1) relates to a method for analyzing an original software program as a potentially evasive malware. The method may comprise discovering at least one revealed instruction in the original software program, where the revealed instructions are not executed when the original software program is run without modification; modifying the original software program to create a modified program that will execute at least one revealed instruction when the modified program is run; and exploring the at least one revealed instruction by running the modified program. This approach has the disadvantage of making modifications to the program code. Malware writers can use anti-tampering methods to detect code modifications (for example, through hash-based checksums or cyclic redundancy checks) and abort execution [Banescu et al. 2018]. This approach has also the disadvantage of introducing program state inconsistency: when new instructions are executed in the execution paths induced by the code modifications, the values in the program's memory may not reflect what those instructions expect at that point. Therefore, the program could terminate prematurely due to errors or exercise unfeasible behaviors (i.e., behaviors that the original program would never display). The limitations of "brute-force" exploration techniques based on sole code modifications are documented, for example, in [Peng et al., 2014].

Document [3] (U.S. Pat. No. 10,311,235 B2) relates to a method for emulating at least one resource in a host computer to a querying hosted code. The method comprises monitoring a plurality of operating system (OS) queries received from a plurality of code executed on a monitored computing unit, the plurality of OS queries are designated to an OS of the monitored computing unit, detecting among the plurality of OS queries at least one query for receiving at least one characteristic of at least one resource of the monitored computing unit among the plurality of OS queries, the at least one query is received from querying code of the plurality of code, preparing a response of the OS to the at least one query, the response comprising a false indication at least one false characteristic of the at least one resource, and sending the response to the querying code in response to the at least one query. This approach has the disadvantage of requiring preconfigured false indication responses when emulating the absence (or presence) of a resource that is characteristic of an existing security solution (for example, a specific sandbox product). Several studies (for example, [Garfinkel et al. 2007]) have shown that identifying all the possible discrepancies ("artifacts" to model when preparing false indication responses) between a machine equipped with a security solution and one without it may be unfeasible. This limitation is shared with systems like Arancino and BluePill that rely on predetermined answers too. To evade the system, an adversary can use a novel fingerprinting technique not accounted for by the preconfigured false indication responses; such events are unsurprisingly frequent in the malware analysis practice (a notable example was given for example by the Furtim malware [SentinelOne 2016], [D'Elia et al. 2020]). This approach may also struggle in the analysis of targeted malware, whose expectations depend on specific characteristics of the intended victim's environment that may not be obvious to predetermine in general.

Document [4] (U.S. Pat. No. 10,747,872 B1) is directed to a computerized method that assists in preventing malware from evading detection through analysis of the virtual hardware components operating within a malware detection system is described. First, a virtual machine (VM) is provisioned in accordance with a guest image, which includes a guest operating system and one or more virtual hardware component. The virtual hardware component including an identifier, and the guest operating system includes a software driver that controls access to the virtual hardware component and features the identifier of the virtual hardware component. Responsive to processing an object within the VM and issuance of a request for an identifier of a hardware component, the identifier of the first virtualized hardware component (virtualization of the hardware component) is received. The first identifier of the first virtual hardware component being an identifier substituted for a prior identifier of the first virtual hardware component before creation of the guest image. This approach has the disadvantage of handling only fingerprinting techniques that inspect the identifier of a virtualized hardware device component (more specifically, when the inspection happens via one or more system calls to the guest operating system for hardware-related services). Therefore, this approach does not have provisions for handling fingerprinting techniques from evasive malware or targeted malware that involve environmental information items of other kinds, such as timing sources, user's processes and files in the machine, and others.

Document [5] U.S. Pat. No. 10,546,128 B2 discloses approaches to deactivating evasive malware. In an approach, a computer system installs an imitating resource in the computer system and the imitating resource creates an imitating environment of malware analysis, wherein the imitating resource causes the evasive malware to respond to the imitating environment of the malware analysis as to a real environment of the malware analysis. In the imitating environment of malware analysis, the evasive malware determines not to perform malicious behavior. In another approach, a computer system intercepts a call from the evasive malware to a resource on the computer system and returns a virtual resource to the call, wherein in the virtual resource one or more values of the resource on the computer system are modified. This approach has the disadvantage of relying on predetermined knowledge (from an analysis of public reports of malware analysis) of what resources (termed "scarecrow resources") are to be imitated: therefore, it would not deactivate an evasive malware that uses only novel fingerprinting techniques. This approach does not provide analysis capabilities for environment-sensitive behaviors of malware, which is the focus of the methods from the present disclosure, but deals instead with the different task of preventing such behaviors from showing on end-user systems (such as desktop, laptop of the user; not systems of a malware analyst).

Document [6] U.S. Pat. No. 10,735,441 B2 discloses a method wherein a service receives traffic telemetry data regarding encrypted traffic sent by an endpoint device in a network. The service analyzes the traffic telemetry data to infer characteristics of an application on the endpoint device that generated the encrypted traffic. The service receives, from a monitoring agent on the endpoint device, application telemetry data regarding the application. The service determines that the application is evasive malware based on the characteristics of the application inferred from the traffic telemetry data and on the application telemetry data received from the monitoring agent on the endpoint device. The service initiates performance of a mitigation action in the network, after determining that the application on the endpoint device is evasive malware. This approach does not handle environment-sensitive malware but focuses on malicious code that tries to evade traffic analyzers by means of mimicry attacks that make its traffic look like the traffic of benign software. Malicious code of this kind would generally execute only after malware has performed its environment-sensitive logic (if any), which is instead the focus of the methods from the present disclosure.

The need is felt for an approach that is automatic, easy to implement, and effective against evasive or in general environment-sensitive malware (such as, e.g., targeted malware).

SUMMARY OF THE INVENTION

An object of the present invention is to provide a method and a system for analyzing an environment-sensitive behavior of an untrusted software program, in particular as a malware sample, that solves totally or partially the problems of the prior art and overcomes the disadvantages of the traditional approaches.

The subject-matter of the present invention is a method and a system according to the attached claims.

BRIEF DESCRIPTION OF THE FIGURES

The invention will now be described for illustrative but not limitative purposes, with particular reference to the drawings of the attached figures, in which:

FIG. 1 depicts an exemplary flowchart for the collection of coverage information and the mutation of environmental information items during the execution of a program.

FIG. 2 depicts a block diagram presenting a general architecture for an exemplary computing device useful for illustrative purposes for the methods and systems from the present disclosure.

FIG. 4 depicts an exemplary flowchart for one embodiment of the proposed methods for analyzing a software program as a potential environment-sensitive malware sample.

Figure 3:
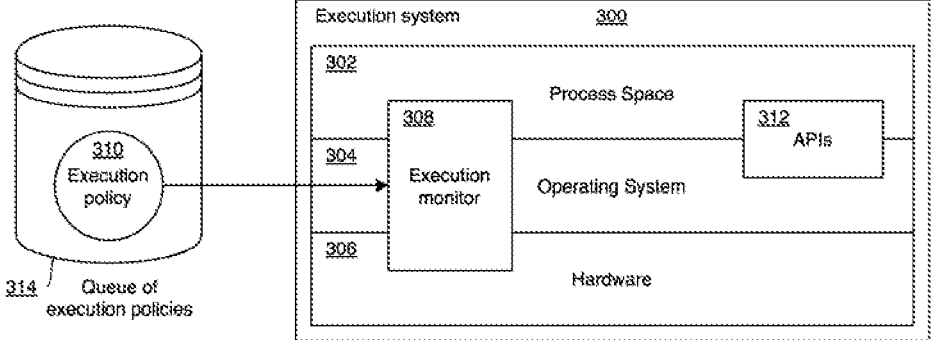
FIG. 3 depicts a block diagram presenting one embodiment of an execution system for analyzing environment-sensitive code in a computing device.

It is specified here that elements of different embodiments can be combined together to provide further embodiments without limits while respecting the technical concept of the invention, as the average person skilled in the art understands without problems this description.

The present description also refers to the known art for its implementation, with regard to the detailed characteristics not described, such as elements of lesser importance usually used in the known art in solutions of the same type.

When an element is introduced, it always means that it can be "at least one" or "one or more".

When a list of elements or characteristics is listed in this description, it is meant that the invention according to the invention "includes" or alternatively "is composed of" such elements.

When features are listed within the same sentence or bullet list, one or more of the individual characteristics can be included in the invention without connection with the other characteristics of the list.

DETAILED DESCRIPTION

The present disclosure is directed to methods and systems for analyzing a software program for potential environment-sensitive behavior, e.g., in case of malware. Generally, an execution monitor (running on an execution system including computer hardware and operating system, environmental information items, and having interposition capabilities) is used to interpose on execution events that see the program accessing items of environmental information from a computer system. The execution monitor also records coverage information for the traversed internal program states and the externally observable (that is, involving other software present on the computer system, such as the OS) actions from the program execution.

The methods described hereafter may comprise monitoring a plurality of accesses to environmental information items. The methods further comprise altering the contents of accessed environmental information items according to an execution policy before the program retrieves them. The methods may further comprise recording, during execution, information for the traversed internal program states and the externally observable actions on the computer system, hereafter referred to as "coverage information" analogously to fuzzing practice. The methods may further comprise using recorded coverage information to generate in a fuzzing fashion execution policies with new contents for environmental information items to be presented to the program in subsequent executions. The methods may further comprise identifying execution policies that lead to previously unseen (never observed or recorded) internal states and externally observable actions on the computer system.

A computer system for analyzing environment-sensitive program (e.g., a malware sample) is provided. The computer system may comprise one or more processors, a volatile memory (RAM), a plurality of storage devices, network devices, I/O devices, and sensors, all interconnected by a bus architecture and configured to: monitor execution of a computer program, recognize access to environmental information items, alter the contents of accessed environmental information before retrieval by the program, record coverage information for the internal states of the program and the externally observable actions on the computer system, generate new execution policies using fuzzing mutations driven by the recorded coverage information, and identify previously unseen internal states and externally observable actions from subsequent executions performed under newly generated policies.

In some embodiments, the system uses dynamic binary instrumentation techniques to interpose on accesses to environmental information items and to record coverage information for the internal states of the program and the externally observable actions on the computer system. In some embodiments, accesses to environmental information items are done through the invocation of operating system APIs, through the use of CPU instructions that provide direct access to environmental information, and through direct accesses to special (shared) memory regions (mapped in the process space, see below). These and other aspects are discussed in detail below.

The present disclosure is directed to methods and systems for analyzing a software program for potential environment-sensitive behavior (such as in the case of a malware sample). Embodiments of the present disclosure improve computer security by providing methods to expose environment-sensitive behaviors of an untrusted software program that may represent potential malware. These methods can provide an efficient part of malware analysis and detection solutions. As a result, for example, products such as anti-virus solutions can be updated by their vendors to recognize such an untrusted program as a threat and make the computers where they operate a safer environment.

Embodiments of the present disclosure include a coverage-guided solution to explore a plurality of execution paths that a software program may take depending on the environment where it executes. An inherent focus of the solution is identifying and further exploring states and behaviors of the program that have not been seen (observed or recorded) before. Coverage information is composed of information on the traversed internal program states (internal coverage) and of externally observable actions on the system (external coverage) during execution.

In general, for all of the embodiments, external coverage information comprises recording, as external coverage information:

information about the actions invoked by the untrusted software program and regulated by the execution monitor (see below) under the current execution policy when accessing environmental information items; and/or information about possible transient and permanent changes done by the untrusted software program's execution to the execution environment under the current execution policy.

Internal coverage includes information about internal program states, including code portions covered (executed or traversed) by the program (the one being monitored) during one execution: for example, the identity of the distinct basic blocks traversed by execution and, optionally, their execution count. More optionally, internal coverage can include information on the data flows of the program. For example, in the case of a code that compares strings or other byte sequences (e.g. a code can be a standard library function or generic comparison instructions part of the program being monitored) such code would take arguments as inputs and the above information on the data flows can comprise the values of such inputs.

External coverage includes information on environmental information items accessed by the program and information on transient and permanent changes brought about by program execution to the global state of the computer system. External coverage information for accesses to environmental information items includes the invocation of operating system APIs for querying environmental information (for example, about items such as files, processes, registry contents, hardware interfaces, timing sources, application windows, and configuration parameters of the operating system), the use of CPU instructions that provide direct access to environmental information (for example, "cpuid" and "rdtsc" on Intel x86 and x86_64 CPUs), and direct accesses by the program to special memory regions (for example, the "KUSER_SHARED_DATA" memory page that the kernel of Microsoft Windows shares with user-space processes). External coverage information for transient changes brought about to the state of the computer system includes, for example, attempted network communications and the creation or opening of temporary objects (for examples, mutexes). External coverage information for permanent changes brought about to the state of the computer system includes, for example, information on one or more of creation, modification, or removal of files, processes, application windows, and configuration parameters of the operating system, where applicable.

Another aspect of embodiments of the present disclosure is the use of execution policies during interposition on accesses to environmental information items. An execution policy is a list of rules for altering the normal operation of specific accesses, for example by modifying the contents that the program can retrieve for the involved environmental information item, by denying the access, or by forging a fake result for an access that the computer system normally denies. For example, a rule in an execution policy can indicate to modify into "svchost" every occurrence of the string "analyzer" in the contents of accessed information items pertaining processes running in the system. For example, a rule in an execution policy can indicate to deny any access to the "vboxdrv.sys" file located in the "C:\Windows\System32\drivers" folder by producing a result as if the file did not exist even if it is present in the machine. For example, a rule in an execution policy can indicate to return as a fake result a random integer number between 65 and 72 for an access to the sensor measurement value for the CPU temperature on a system running in a hypervisor that does not expose temperature sensor values to its guest systems.

Embodiments of the present disclosure attempt multiple executions of a software program under different execution policies and use internal and external coverage information as a feedback to prioritize, in the method operation, the execution policies that lead to previously unseen internal states or externally observable actions. An aspect of the methods from the present disclosure is that they do not need to rely on the identification of which program instructions act on the contents of retrieved environmental information items and they do not use predetermined values for altering such contents owing to the fact that the invention uses an adaptive mechanism using policies mutations. The methods from the present disclosure operate in an automated manner to test the end-to-end effects, on a software program, of the values it retrieves for its accessed environmental information items and to generate accordingly execution policies that can expose new behaviors, progressively "learning" from past executions done under different environment policies.

The methods from the present disclosure revisit the concept of fuzzing, short for fuzz testing, that is largely popular in software testing research and practice. Fuzzing embodiments, also called "fuzzers", are known for their ability to effectively expose bugs in software programs with little-to-none prior knowledge of the subject under analysis. More specifically, coverage-guided fuzzers generate random inputs and use them as feedback if the execution of the current input results in previously unseen coverage (typically, program parts not covered by any prior execution) for the program. When this is the case, the input is termed "interesting" in fuzzing terminology and retained in a queue so to perform more mutations over its content, so that such mutated inputs can hopefully lead to additional new coverage when executed. One of ordinary skill in the art can observe that existing fuzzing methods cannot be applied to the analysis of malware for a number of reasons.

The first main reason is that the programs that are subject to fuzz testing have well-defined input interfaces (e.g., a file or a buffer in memory) and oftentimes come with an auxiliary program ("harness", [Jung et al., 2021]) that sets up the correct program internal state for reaching specific code regions to be tested and executes them directly. On the contrary, the methods in this disclosure propose the concept of execution policy as a unifying umbrella to interpose on program accesses to multiple variable sources of environmental information from a whole computer system and alter their normal contents, modifying how the program under analysis perceives the surrounding environment and, as a result, altering the behavior of such program without actually modifying the program. In an adaptive automatic fashion, the collected coverage information guides, among others, the selection of what "input" environmental information items an execution policy should alter.

The second main reason is that the programs that routinely undergo fuzz testing are made of benevolent code, whereas a potential environment-sensitive malware sample exhibits adversarial behavior against analysis attempts. One of the consequences is that in an adversarial setting conventional feedback mechanisms such as code coverage can lose their effectiveness: for instance, when a malware writer uses one or more code regions containing stalling sequences, a traditional fuzzer solution would retain and further mutate "inputs" leading to these code regions only because new code is exposed, despite such code does not reveal any relevant behavior for malware analysis. The interplay and the necessary individual contribution of the multiple sources of coverage information used as feedback in the present disclosure are discussed below.

The feedback mechanism used in the embodiments of the present disclosure relies on internal and external coverage information collected during execution. When an execution policy exposes during execution previously unseen internal or external coverage, it is considered interesting and therefore retained in a queue. An execution policy that brings about internal and external coverage identical to any previous execution policy is considered uninteresting and therefore discarded. Novel information in terms of external coverage for transient or permanent effects on the system can be particularly relevant for malware analysis, since a potential environment-sensitive malware typically alters some aspects of the system only after some of its expectations on the environment are met by the system where it executes.

In fact, not considering both internal and external coverage information would lead to high inefficacy of the methods, as explained in the following.

On the one hand, embodiments of the present disclosure could lose efficacy by not considering such external coverage as feedback, since internal coverage alone may not suffice to suggest that some of the program expectations on the environment were met. Novel information in terms of external coverage for accessed environmental information items can be relevant for malware analysis, since the queried item may potentially be involved in an environment-sensitive decision logic for the malware sample (or other environment-sensitive program, here and in the rest of the description). Embodiments of the present disclosure could also lose efficacy by not considering such external coverage as feedback, as for example they would not be able to distinguish when previously unseen accesses to environmental information items are made, which in turn may be a consequence of some of the program expectations on the environment being met thanks to the performed mutations.

On the other hand, there are cases where either such new accesses are not involved in any environment-sensitive decision logic (malware authors can add decoy operations of this kind to complicate their analysis) or there is no new external coverage information (because some condition from the decision logic is not met by the execution environment). In such cases, novel information for internal coverage is crucial in order to track any progress done in the exploration of program behaviors, and, in some embodiments of the methods, to expose further information on the internal state of the program that can drive the generation process of new execution policies. However, as explained before, embodiments of the present disclosure that would consider only internal coverage as feedback could see a significantly reduced efficacy. For example, they would be deceived when reaching new code regions inserted by malware writers for anti-analysis purposes (for example, they contain stalling sequences), since those regions hardly represent any useful novelty but, in the lack of external coverage information, they would look worthy of further exploration in subsequent executions under new mutations. More generally, embodiments of this kind that would consider only internal coverage as feedback would not be able to discriminate when newly seen code is involved in interactions with the environment.

Embodiments of the present disclosure generate a new execution policy from an existing one by applying one or more mutation functions (hereafter mutations for brevity) that are designed specifically to produce a list of rules for altering the normal operation of accesses to environmental information items. According to the invention, a mutation takes as input an execution policy and the external coverage information from an execution under such policy. For each access to an environmental information item that is recorded in external coverage information, it is checked whether the existing execution policy contains one or more rules involving the access. When no such rule exists, a mutation may be added, for example, to modify the contents of the item, to deny the access, or to forge a fake result for an access otherwise denied by the system. A mutation may also not be added, leaving such access unaltered. When one or more rules exist, each such rule can be altered in its contents, when applicable, or be replaced with another rule, or be removed. A new execution policy is therefore obtained by applying one or more mutations to an existing execution policy, which in principle can also be an empty one (for example, an empty execution policy can be used when attempting the first execution of a software program).

In general, a new execution policy is generated by means of random, fuzzing-style mutations of the rules in an execution policy, wherein the random, fuzzing-style mutations are made on the basis of said information about the actions recorded in the external coverage information. The new execution policy can be set as the current execution policy.

In general, mutations are aware of the structure of the environmental information. Mutations that change the value returned by the normal operation of an access to an environmental information item include, but are not limited to, adding, modifying, or deleting portions of the contents by means of operators that are aware of and normally preserve the structure and type of the involved environmental information item. Mutations for values can apply to any of their constituent bytes (for example, bit and byte flipping, arithmetic increments and decrements, substitution with random bytes, substitution with predefined or user-defined constants) and, for structured values, to their structure too (for example, adding, duplicating, splitting, concatenating, or deleting items from a list, such as a list of the processes running in the computer system) [Pham et al. 2019]. Mutations that involve creating fake results encode values that are structurally consistent with the expected format (for example, a positive integer value for a CPU temperature sensor); furthermore, when eventually deriving other new policies from the one currently being created, such values can be handled using the same mutations described above for modifying values returned by the normal operation of the computer system.

Optionally, mutations can benefit from internal coverage information on the data flows of the program to optimize the efficiency of the process of generating new execution policies. For example, internal coverage information recorded for strings or byte sequences used as input arguments to standard library comparison functions can be used to extend, shrink, or replace a portion of a value from an accessed environmental information item. Suppose for example that a software program accesses the list of running processes on a VirtualBox virtual machine which includes a "vbox-tray.exe" process and that recorded internal coverage information includes a call to the string comparison function strstr( ) from the C standard library taking as its two arguments "vboxtray.exe" and "vbox": a mutation may then replace or remove the entry pertaining "vboxtray.exe" from such list of processes, making an educated guess that the string obtained from the environmental information item eventually reaches the strstr( ) operation (which checks whether its second argument is a substring of its first argument) and changing it would cause also the outcome of strstr( ) to change (in order to see whether or not the program is sensitive to this change). The example is provided for illustrative purposes only and is not intended to be limiting: the same invention method can be used, for instance, to mutate one or more bytes that are seen (similarly to "input-to-state correspondence" as described in fuzzing literature [Aschermann et al. 2019] for bugs search) as operands for program's comparison instructions from recorded internal coverage information (for example, "rep cmpsb" can be used on Intel x86 CPUs to realize a functionality alike to the memcmp( ) function from the C standard library).

In general, software program instances to be analyzed as potential environment-sensitive malware come in the form of binary code. To detect access to environmental information items and identify coverage information from execution, several technologies for dynamic binary analysis are available. Possible embodiments in different such technologies will be illustrated in the remainder of this disclosure. When malware instances do not come in the form of binary code, the present solution can still be applied, provided that the execution environment or system offers, or can be modified to offer, interposition capabilities. For example, in the case of interpreted scripting languages, the interpreter can be modified to collect internal coverage information and to interpose on any interaction with the system to collect external coverage information and to alter the values for accessed environmental information items before retrieval by program code.

FIG. 1 depicts an exemplary flowchart for the collection of coverage information and the altering of environmental information items during the execution of a software program. At step 100, the execution of the software program is started and monitored within an analysis environment. At step 102, the analysis environment interposes on requested accesses to one or more environmental information items by the software program and possibly alters the contents eventually retrieved by the software program. The monitor responds to said requested accesses by taking the actions according to the current execution policy 310.

At step 104, coverage information for internal states of the software program traversed during execution is recorded. At step 106, coverage information for actions from program execution that bring transient and permanent changes to the computer system is recorded. At step 108, coverage information for accesses to environmental information items during execution is recorded. In some embodiments, steps 104, 106, and 108 may be executed in a different order than the one illustrated in FIG. 1 or may not be executed sequentially. In the following, these steps are further detailed.

At step 100, the execution of the software program is started within an analysis environment, in particular a controlled execution environment with dynamic program analysis capabilities including interposition (interposition being a standard concept in the field). A detailed example of such controlled execution environment is the execution system 300 in FIG. 3 that will be presented in the remainder of the present disclosure. The execution environment monitors execution as the program interacts with the surrounding environment.

At step 102, the analysis environment interposes on accesses to environmental information items from the software program. An execution policy specifies which of the accesses should see their normal operation altered before the contents visible or produced via such accesses are retrieved by the program. For such accesses alteration, an execution policy specifies changes, termed "mutations" above, for their accessed or produced contents that include, but are not limited to, adding, modifying, or deleting portions of the contents by means of operators that are aware of and normally preserve the structure and type of each involved environmental information item.

At step 104, coverage information for internal states of the program traversed during execution is collected. This coverage was termed "internal coverage" above and includes information on the code portions used by the program during one execution: for example, the identity of the distinct basic blocks traversed by execution and, optionally, their execution count. More optionally, internal coverage can include information on the data flows of the program. Examples of the data flows have been given above.

At step 106, coverage information for program actions that bring about transient or permanent changes to the computer system is collected. This coverage is one of the two information kinds termed "external coverage" above. In some embodiments, activities regarding the creation of files, processes, network connections, and other externally visible objects (for example, inter-process communication objects) are recorded.

At step 108, coverage information for accesses to environmental information items from the program identified via interposition during execution is recorded. This coverage is the other of the two information kinds termed "external coverage" above. In some embodiments, activities regarding the invocation of operating system APIs for querying environmental information (for example, about files, processes, registry contents, hardware interfaces, timing sources, application windows, and configuration parameters of the operating system), the use of CPU instructions that provide direct access to environmental information (for example, "cpuid" and "rdtsc" on Intel x86 and x64 CPUs), and direct accesses by the program to special memory regions (for example, the "KUSER_SHARED_DATA" memory page of Windows) is recorded.

FIG. 2 depicts a block diagram presenting a general architecture for an exemplary computing device 200 useful for illustrative purposes for the methods and systems described in the present disclosure. The exemplary computer system 200 includes one or more processors 202 that are in communication, through a bus interface 206, with main memory 204 and with storage devices 208, network devices 210, I/O devices 212, and hardware sensors 214.

In some embodiments, one or more devices are constructed to be similar to the computing device 200. In some embodiments, the computing device 200 can be a personal computer device, for example a laptop or a desktop machine. In some embodiments, the computing device 200 can be a server. In some embodiments, a server may be made up of multiple computer systems 200. In some embodiments, a server may be a virtual server, for instance hosted in the cloud.

The processor (CPU) 202 can be any suitable processing device and can be a single processor, a multi-core processor, or a plurality of single-core or multi-core processors that are operatively connected. In many embodiments, a processing device is a general-purpose microprocessor unit, such as those manufactured by Intel Corporation or Advanced Micro Devices supporting the x86 and x86_64 instruction set architectures. The processor 202 accesses the instructions and the data from the memory 204.

The memory 204 can store the instructions and data (such as the untrusted software program) that are executed by the processor 202. In many embodiments, the memory 204 can include one or more banks of volatile Random Access Memory (RAM).

The bus interface 206 operatively connects the different components of the computer system 200. In many embodiments, the bus interface 206 can include shared and dedicated internal data buses associated with the processor 202, the memory 204, the storage devices 208, the network devices 210, the I/O devices 212, and the hardware sensors 214.

The storage devices 208 can be one or more non-volatile memory storage devices. The storage devices can include, for example, magnetic hard disk drives, solid-state disk drives, memory cards, external disk drives, and combinations thereof.

The network devices 210 can allow the computing device 200 to communicate with remote computing devices via one or more data networks. The network devices 210 can be one or more physical or virtual Network Interface Cards (NICs) offering access to networks (for example, Local Area Networks) by means of physical mediums such as, for example, an Ethernet cable or an IEEE 802.11 wireless link.

The input/output (I/O) devices 212 can allow the computing device 200 to communicate with peripheral devices. In many embodiments, I/O devices 212 include any combination of keyboard, mouse, display devices, audio devices, printers, and other peripheral devices of common use.

The hardware sensors 214 can allow a code running on the computing device 200 to read physical measurements associated to its operating status. In many embodiments, hardware sensors are available, for example, to measure the temperature of the cores of the processor 202 and the speed of the fan operating to cool a given core, the voltage currently measured for the memory banks 204, and the temperature of a hard disk drive among storage devices 208.

FIG. 3 depicts a block diagram presenting one embodiment of an execution system 300 for analyzing environment-sensitive code in a computing device 200.

As depicted, the execution system 300 builds on a general computing system comprising a stack made of hardware 306 and of multiple software elements operating on top of the hardware. Software is made of instructions and data, both residing in physical memory (e.g., RAM 204) during execution. One or more CPU cores (e.g., CPU 202) execute the instructions of the program and manipulate its data following the semantics of the instructions. In many computing systems, the operating system 304 is a software program that assists the execution of user-level software programs by providing them with an isolated process space 302 and, by means of APIs 312, with simplified interactions with the hardware 306 and with other programs. The execution system 300 hosts an execution monitor 308 implemented at one or more layers of the hardware/software stack. The execution monitor can interpose on specific events during the execution of a software program for the purpose of logging them and for altering their normal course according to what is dictated by an execution policy 310 in use for the current execution instance. The execution system 300 can accommodate multiple alternative execution policies by means of a queue 314 (the list and the policies are in a database 310, 314 of sets of information including rules and termed "execution policies", the rules defining actions to be taken by the execution environment upon receiving requests of access by (i.e. when interposing on requests of access) a software program to said environmental information items, the database being accessible to said execution monitor 308).

The hardware 306 layer of the diagram represents the physical resources of a computer device that are made available to software programs in an execution system 300. The hardware layer can be implemented, for instance, using the previously discussed computing device 200.

The operating system 304 layer of the diagram provides software programs with mediated and simplified access to the hardware 306 and with tools that facilitate their individual operation and, where applicable, the communications they may need with other software programs. Examples of operating systems include the different versions of Microsoft Windows, Apple MacOS, and UNIX derivatives (e.g., Linux). In general, an operating system includes privileged kernel components that interact with the hardware, schedule the execution of multiple processes, and accomplish other relevant tasks that support the execution system. In some embodiments, the operating system runs on a hypervisor hosted directly on the hardware or within a second operating system (known as host operating system). In general, the operating system provides the process space 308 with access to the hardware 306 and to operating system tools by means of APIs 312.

Application Programming Interfaces (APIs) 312 are features provided by the operating system 304 to software programs that can be used, for example, to access or modify contents on storage devices 208, to communicate through network devices 210, to operate on I/O devices 212, and to access hardware sensors measurements 214. APIs are provided by the operating system 304 also to inspect or change its configuration and state (e.g., the Windows registry), to inspect or change aspects of the process space 302 (e.g., environmental variables, execution privileges), and to realize inter-process communications.

The process space 302 layer of the diagram is an abstraction that encloses the memory and operating system resources (e.g., file handles, network sockets) in use during the execution of a software program. Generally, the operating system loads the instructions and data of a software program to a memory area that is under exclusive use of the process created to execute the software program. When a software program makes use of an API 304, the result of the operation is made available by the operating system 306 directly in an area within the memory assigned to the process executing the software program. The software program can also use special CPU 202 instructions that provide direct access to environmental information, such as CPU and memory characteristics information or timing sources, without the mediation of the operating system 306. In some execution systems, a software program can find specific items of environmental information immediately available in its memory and can therefore access them directly (that is, without the mediation of the operating system 306 or the execution of special CPU 202 instructions), for example when the operating system 306 maps in the process space for software execution a view of one or more pages of memory belonging to the kernel itself and containing environmental information (for example, system time).

The execution monitor 308 is a component that can interpose on specific execution events in order to log them and possibly alter their course of operation. An execution monitor can be implemented at one or more layers of the execution system 300 using one or more dynamic program analysis solutions of the prior art with interposition capabilities. In some embodiments, interposition for the execution monitor 308 can be implemented entirely within the process space 302 using program instrumentation techniques from a dynamic binary instrumentation (DBI) framework. Examples of DBI frameworks suitable for this scenario include, but are not limited to, Intel Pin and DynamoRIO. In some embodiments, interposition for the execution monitor 308 can be implemented entirely within the hardware layer using a modified special-purpose hypervisor (for example, similarly to the modified Xen hypervisor used by the DRAKVUF malware analysis system) or a full system emulator (for example, the QEMU emulator with the modifications done in the PyREBox malware analysis system). In some embodiments, interposition for the execution monitor 308 can be implemented using a modified operating system 304 that interposes on specific APIs and a modified CPU (e.g., a customized RISC-V processor) that interposes on instructions depending on their type (e.g., instructions that provide direct access to environmental information), position in memory or, optionally, operand values. More in general, the execution monitor 308 is capable of logging execution events of interest and of altering their natural course according to what dictated in the execution policy 310 in use for the current execution. For example, it can change the result provided by some operation (e.g., an API call), it can cause the failure of a query or access that normally succeeds on the execution system 300, or it can forge a fake result for an access or query that would be denied or unsuccessful on the execution system 300.

The execution policy 310 is a list of rules that instruct the execution monitor 308 to alter the normal operation of specific accesses to environmental information items during the execution of a software program, for example by modifying the contents that the program retrieves for the involved environmental information item, by denying the access, or by forging a fake result for an access that the execution system 300 normally denies. When an execution policy contains no rule, all of the accesses to environmental information see their normal course of operation. When a program is executed in the execution environment 308 under an execution policy 310, the execution policy may be annotated with internal and external coverage information recorded for that execution (i.e., the internal and external coverage information is in some way attached to the execution policy as a part of it). Recorded external coverage information for accessed environmental information items includes the values made available to the program after all rules in 310 have been applied (and optionally before applying the rules).

Execution policies are stored in a queue of execution policies 314 in no particular order. A malware analysis system implemented on top of the execution system 300 can manage the addition, removal, or modification of execution policies stored in the queue.

FIG. 4 depicts an exemplary flowchart for one embodiment of the proposed methods for analyzing a software program as a potential environment-sensitive malware sample in a controlled execution environment like the execution system 300. FIG. 4 depicts steps performed in a particular order for purposes of discussion and illustration, whereas the methods of the present disclosure are not limited to the particularly discussed arrangement. The various steps can be adapted, combined, or rearranged in various ways without deviating from the scope of the present disclosure.

At step 400, a policy for regulating environmental information during program execution is defined and added to the queue of execution policies. At step 402, an execution policy is picked from the queue. At step 404, the policy undergoes mutation functions to obtain a new policy. At step 406, the execution of the software program in the controlled analysis environment is started under the new policy. At step 408, the analysis environment interposes on accesses to environmental information items by the software program and alters their course of action as dictated by the new policy. At step 410, coverage information is recorded for internal states of the software program traversed during execution, for actions from program execution that bring transient and permanent changes to the computer system, and for accesses to environmental information items. At step 412, coverage information is analyzed to determine whether the execution under the new policy resulted into new coverage (novel information) compared to the plurality of previously performed executions. If the new policy did not provide new coverage, operation continues to step 414, where the policy is discarded and operation continues to step 402 wherein another, current execution policy is selected based on pre-determined selection rules. If the new policy provided new coverage, operation continues to step 416. At step 416, the new policy is annotated with recorded information for coverage and is added to the queue of policies. At step 418, the recorded actions from program execution leading to transient or permanent changes to the state of the computer system are analyzed again to determine whether an execution under the new policy resulted into new actions compared to the plurality of previously analyzed executions. If no new actions are found, operation continues to step 402. If new actions are found, operation continues to step 420. At step 420, the mutated policy is reported to the user of the malware analysis system, as the new actions have been revealed as an instance of possibly malicious or undesired environment-sensitive behavior. Optionally, operation can continue to step 402 or stop. In the following, these steps are further detailed.

Step 400 defines the initial execution policy 310 that is added to the initially empty queue of execution policies 314. Optionally, more than a single execution policy can be added at this step. Such an execution policy may be one with no rules. Such an execution policy may or may not contain coverage information; when coverage information is not present, the execution policy is annotated (cf. description of 310) by collecting coverage information in a preliminary run of the software program in the execution system 300 (therefore, new execution policies can be derived in subsequent steps with rules based on detected external coverage). In some embodiments, the initial execution policy contains one or more rules, for example deriving from prior analyses done in the malware analysis environments following the process of FIG. 4. This can be helpful for searching additional environment-sensitive behaviors from a malware sample. Also, this can be helpful for advanced evasive malware that, upon detecting an analysis environment, mimics the behavior of other malware that was largely documented before, misguiding human experts that would consider it uninteresting for an in-depth analysis and therefore overlook the threat.

Step 402 selects an execution policy from the queue. Selecting an execution policy does not imply its removal from the queue; therefore, the execution policy may be selected again in future executions of 402. In many embodiments, the selection process can be regulated by pre-determined rules. As an example, it can be regulated by energy scores assigned to each execution policy in the queue. The energy score represents the likelihood with which a policy is selected at each execution of 402, analogously to energy scores used for seed scheduling in coverage-guided fuzzing embodiments for software testing [FuzzingBook 2022]. The rules, also known as "power schedule" in fuzz testing literature [FuzzingBook 2022], that regulate energy score values are a tuning detail for when implementing a system, that is, the rules affect how quickly the system achieves a given result but do not affect the ability of the system to achieve such a result in general. For example, a power schedule that assigns equal energy to all execution policies is a valid power schedule for realizing 402; in this power schedule, which we term uniform, each of the execution policies in the queue can be selected at 402 with probability 1/n where n is the number of execution policies in the queue at that time. A different power schedule or other scoring/predetermined rules, for example, may try to prioritize for selection at 402 those execution policies that, by means of the following steps in the flowchart of FIG. 4, may progressively lead to higher coverage increase in shorter time. In many embodiments, each execution policy in the queue is annotated with an energy value to implement a power schedule for driving the selection process. In some embodiments, a uniform power schedule can be used. In some embodiments, an adaptive power schedule can be used, where the energy score of an execution policy changes over time depending on what coverage improvements, by means of the following steps in the flowchart of FIG. 4, are observed at 412 for program executions under execution policies derived from the current policy. For example, if an execution policy is selected at 402 one or more times but no subsequent coverage improvements are found, its energy score is lowered in favor of other execution policies in the queue. Various other power schedules/scoring/predetermined rules are possible but are not discussed for the sake of brevity. A combination of such exemplary strategies can also be used.

Step 404 derives a new execution policy from the one selected at 402. A new execution policy can be derived by applying one or more mutation functions ("mutations") to obtain rules that alter the normal operation of accesses to environmental information items by a software program during its execution. In many embodiments, rules can include modifying the contents of such an item before its retrieval by the program, denying an access, or forging a fake result for an access that is denied by the normal operation of the underlying execution system (computing environment) 300. In many embodiments, mutations can include adding a new rule, deleting an existing rule, and modifying an existing rule in the criteria it uses for value manipulation (data manipulation). The added and/or deleted and/or modified rules can be based on the information about the actions invoked by the software program and regulated by the execution monitor.

In many embodiments, rules involve accesses to environmental information items listed in the annotations for the execution policy selected at 402. In many embodiments, value manipulations include, but are not limited to, adding, modifying, or deleting portions of the contents observed as a result of accessing an environmental information item. Value manipulations include but are not limited to primitive operations such as bit and byte flipping, arithmetic increments and decrements, substitutions with other byte sequences, and to structural operations such as adding, removing, and altering individual items in values made as structured data types such as lists. Optionally, some embodiments can use, whenever available in the annotations for an execution policy, internal coverage information such as byte sequences recorded at comparison instances (e.g., parameters for calls to byte comparison functions from standard libraries) when performing the above mentioned primitive and structural manipulation operations. For these embodiments, similar and other examples of uses of coverage information for this purpose have been discussed earlier in this disclosure.

Step 406 executes the software program under the execution policy obtained at step 404. The execution relies on a dynamic program analysis solution with interposition capabilities, as the one provided by the execution monitor component 308 of the execution system 300.

Step 408 interposes on accesses by the software program to environmental information items during execution 406. Similarly to 406, interposition is done by means of standard interposition techniques in the execution monitor 308. Interposition includes identifying such accesses and, if prescribed by the execution policy from step 404, altering their course. In many embodiments, interposition is done on the use by the software program of operating system APIs 304 for querying environmental information (including, but not limited to, files, processes, registry contents, hardware interfaces, timing sources, application windows, and configuration parameters of the operating system), of CPU instructions that provide direct access to environmental information 202, and of direct accesses to special memory regions (cf. 108) of its process space 306.

Step 410 records internal and external coverage information for the execution 406 of the software program under the execution policy from 404. Similarly to 406, the collection of the information to be recorded is done by means of standard interposition techniques in the execution monitor 308. As discussed before, for an execution internal coverage is defined in terms of the traversed internal program states and external coverage is defined in terms of the externally observable actions on the system done by the program. In many embodiments, internal coverage includes information on the code portions covered by the program during one execution: for example, the identity of the distinct basic blocks traversed by execution. In some embodiments, also the execution count of each basic block is recorded. Some embodiments can record optional internal coverage on the data flows of the program, such as the values for input parameters when it uses library functions or own comparison instructions (code portions) that compare strings or other byte sequences (cf. 404). In many embodiments, external coverage includes information on environmental information items accessed by the program and information on transient and permanent changes brought about by program execution to the global state of the computer system. Information of the first kind is defined identically to 408: step 410 therefore simply records what already monitored at 408. In many embodiments, information of the second kind includes, but is not necessarily limited to, the creation, modification or removal of files, processes, application windows, and configuration parameters of the operating system, where applicable, network communications attempts, and the creation or opening of temporary objects such as mutexes and other inter-process communication objects. As an added value, information on the changes that the program brings about to the global state of the computer system can characterize its behavior and expose a hidden malicious nature, whereas information on the accessed environmental information items and the values made available to the program after the rules from the execution policy of 404 are applied can show how to configure an execution system (including, but not limited to, 300) to make the program show such environment-sensitive behaviors.

Step 412 analyzes coverage information from step 410 and compares it to the plurality of coverage information annotated in the execution policies currently in the queue. This step can be implemented analogously as in how a standard fuzz testing solution analyzes the coverage of the currently tested input against the coverage for each of the inputs in its queue at that time. If no new coverage is found, the execution policy from 404 has brought about no apparent progress towards revealing new environment-sensitive behaviors for the program, therefore the operation continues with step 414 where the policy is discarded. If new coverage is found, the execution policy from 404 is indicative of progress ("positive feedback") in the exploration of the behaviors of the program, therefore operation continues with step 416.

Step 416 saves the coverage information from step 412 as an annotation to the execution policy from step 404 and adds the annotated execution policy to the queue (in general to the database). In subsequent iterations of the operation cycle of FIG. 4, the annotated information can be used at step 404 to generate a new execution policy and is used at steps 412 and 418 when comparing the coverage for an execution with the coverage from the plurality of past executions. In some embodiments where an adaptive power schedule (cf. description of 402) is in use, the execution policy is added to the queue with an energy score that is equal to the one of the policy selected at 402 when the new coverage identified at 412 is of internal kind only and with a higher energy score otherwise; this heuristic criterion can initially favor at subsequent iterative executions of 402 the selection of execution policies that bring about new externally observable effects over those that bring about new internal coverage only.

Step 418 performs an analysis of coverage information from step 410 that is focused on the transient and permanent effects from the execution of the program on the state of the execution system 300. Such externally observable effects are a linchpin of malware analysis, as they characterize the possibly malicious behavior of an untrusted software program and are the subject of many subsequent analyses and processes as discussed earlier in the present disclosure. When no new transient and permanent effects are observed compared to the plurality of coverage information annotated in the execution policies currently in the queue, operation continues to step 402. When new transient and permanent effects are observed compared to the plurality of coverage information annotated in the execution policies currently in the queue, the execution policy is considered as significant and is reported as an output of the analysis (step 420). What is reported consists of the rules from the execution policy that controlled the execution and the external coverage recorded at step 410 for both accesses to environmental information items and the transient and permanent effects on the system. What is reported also contains the specific values made available to the program at step 408 (including the values for items left unaltered) and recorded at 410; optionally, it may contain also the original values for those accesses to environmental information items whose normal course of action was altered at 408. Optionally, what is reported also contains internal coverage information for the program. Optionally, the operation continues to step 402 to continue the exploration of the program to reveal, if possible, new coverage information related to environment-sensitive behavior compared to the plurality of coverage information annotated in the execution policies currently in the queue.

Two or more of the parts (elements, devices, systems) described above can be freely associated to each other and considered as a kit of parts according to the invention.

Hereafter, it is provided an environment-sensitive program fragment as a running example:

```
1.    bool value1 = API_checkIfFileExists(
          "C:\Windows\System32\VBoxDisp.dll");
2.    if (value1 != false)
3.        API_exit(0);
4.    int cpuInfo[4];
5.    long startValue ==_ rdtsc( );
6.    _cpuid(cpuInfo, 1);
7.    long value2 =_rdtsc( ) - startValue;
8.    if (value2 > 1000)
9.        API_exit(0);
10.   if (value2 < 50)
11.       executeStallingSequence( );
12.   char* value3 = API_getMACAddressOfMainNIC( );
13.   if (strstr(value3, "00:08:27"
14.       API_exit(0);
15.   API_HTTPConnectTo("https://www.evilmalware.it");
```

For the sake of readability, the program fragment is expressed in a C-like pseudocode instead of binary code; the program fragment can be compiled to a binary executable that runs on a computer system with the Windows OS 304 and an x86 or x86_64 CPU 202. The program fragment connects to the URL at line 15 only if all of the following conditions are met by the environment: i) a "VBoxDisp.dll" file does not exist in the "C:\Windows\System32" system folder, ii) executing the "cpuid" instruction takes between 50 and 1000 CPU cycles, and iii) the MAC address of the main network device does not start with "00:08:27". Condition i) is related to the presence of the display driver for the VirtualBox hypervisor, since VirtualBox is a common choice for sandboxes and other analysis machines for malware. Condition ii) is related to how fast the "cpuid" instruction executes, wherein its latency is measured by using the "rdtsc" instruction twice: such latency is known to increase significantly when executing in a hypervisor compared to an execution on bare-metal hardware [Brengel et al. 2016]. Furthermore, some malware analysis systems may improperly alter the return value of "rdtsc" after a "cpuid"

execution, resulting in a latency possibly too low to be realistic. For simplicity, in the pseudocode the _cpuid( ) and _rdtsc( ) intrinsics available in several C compilers are used to invoke the corresponding CPU instructions. For the _cpuid( ) intrinsic, the supplied argument value "1" is a standard configuration parameter for instruction "cpuid" that will go in CPU register EAX before its execution, while the supplied argument value "cpuInfo" is the address of a memory buffer where _cpuid( ) will copy what instruction "cpuid" writes to CPU registers EAX, EBC, ECX, and EDX; the program fragment does not use the contents written to the buffer. Condition iii) is related to the MAC address for the main network device of computer system: in the VirtualBox hypervisor, emulated network devices have characteristic default MAC addresses starting with "00:08:27", where each pair of digits is a hexadecimal number representing one MAC address byte. Function "executeStallingSequence" is a function part of the program fragment (its code is not reported for brevity) that executes stalling operations as an evasion technique. Functions whose name starts with "API" are fictional (in the real system we have different names) APIs 312: the actions they execute are described by the English words in their names; real Windows APIs can be used in their place (for example, the "ExitProcess" API in place of "API_exit").

Next, it is provided an exemplary analysis of the previous program fragment with the operation cycle of FIG. 4. In the exemplary analysis, 5 iterations of the cycle, visually marked as (Iteration-1) . . . (Iteration-5), are done but the number of iterations and the applied mutations at each iteration may differ in other runs of the method. In the exemplary analysis, the individual lines of pseudocode are used for computing and comparing code coverage between pluralities of executions. In the exemplary analysis, a uniform power schedule (cf. description of 402) is used. At step 400, an execution policy containing no rules is selected and added to the queue. After executing the program fragment in the execution system 300 under such execution policy, the policy is annotated with the observed coverage information, which includes an access to environmental information by means of the OS API "API_checkIfFileExists" with argument "C:\Windows\System32\VBoxDisp.dll" and "true" as result; since execution terminates when the program reaches line 3, there are no further observed events for external coverage information. (Iteration-1) The annotated policy is selected from the queue at step 402 and used at step 404 to create, using coverage information annotated in it, a new execution policy containing a rule to make API_checkIfFileExists return "false" as result when its input argument is "C:\Windows\System32WBoxDisp.dll". With this new policy, steps 406, 408, and 410 see the execution of the program fragment cover new program parts (lines 4-9), make new accesses to environmental information (two via "rdtsc" and one via "cpuid", invoked by the respective compiler intrinsics described before), and make no changes to the state of the system. Since new coverage is found at step 412, the operation continues to step 416 where the new policy is annotated with the recorded coverage information and added to the queue. At step 418, the operation continues to step 402 since no new changes to the system's state were made. (Iteration-2) At step 402, the last created policy is picked. At step 404, a new execution policy is created from it by adding a rule that alters the values returned by the two "rdtsc" instructions (the two form a well-known "rdtsc sandwich" [Oyama 2019] and can be altered by a single rule) so as to make their difference equal to a random small quantity, for example 35. Steps 406, 408, and 410 see the execution of the program fragment cover new program parts (lines 10-11 and the code for the program's function "executeStallingSequence") but no new accesses to environmental information items or changes to the system's state are recorded. Therefore, thanks to the new internal coverage, at step 412 the operation continues to step 416 where the new policy is annotated with the recorded coverage information and added to the queue. At step 418, the operation continues to step 402 since no new changes to the system's state were made. (Iteration-3) At step 402, the last created policy is picked. At step 404, a new execution policy is created from it by adding a new rule that alters the value returned by the "cpuid" instruction. However, the following steps 406, 408, and 410 see no new coverage information from the execution compared to the plurality of priors executions, therefore at step 414 the policy is discarded and the operation continues to step 402. (Iteration-4) At step 402, the policy added as second-last (that is, the one that modifies the results of "API_checkIfFileExists" and of the two "rdtsc" instructions) is picked. At step 404, a new execution policy is created from it by modifying the rule that alters the values returned by the two "rdtsc" instructions so that their difference will now be a random quantity larger than before, for example 135. With this policy, steps 406, 408, and 410 see the execution of the program fragment cover new program parts (lines 12-14), make a new access to an environmental information item (via "API_getMACAddressOfMainNIC" whose output is "00:08:27:ab:01:23"), but make no changes to the state of the system. Therefore, thanks to the new coverage, at step 412 the operation continues to step 416 where the new policy is annotated with the recorded coverage information and added to the queue. At step 418, the operation continues to step 402 since no new changes to the system's state were made. (Iteration-5) At step 402, the last created policy is picked. At step 404, a new execution policy is created from it by adding a new rule to make "API_getMACAddressOfMainNIC" return a different value than the output one that was annotated in the policy. For example, a new value can be obtained by mutating an individual byte of the MAC address. Depending on what byte is involved (that is, any of the first three bytes or any of the last three bytes), the condition at line 10 of the program fragment will or not be met. In the exemplary analysis, the mutation is done on the first byte transforming the initial "00" into a "01" through an arithmetic increment, a bitflip on its least significant bit, or another typical fuzzing mutation; if any of the last three bytes were chosen instead, which would lead to an ineffective mutation for the program fragment, the operation cycle of FIG. 4 is capable to modify the rule in subsequent iterations. In embodiments that at step 404 can use optional internal coverage information for data flows during mutations, it would be possible to see an "input-to-state correspondence" [Aschermann et al. 2019] between the first part of the MAC address returned by the API and the string used at line 10 as argument for the substring search function strstr( ) from the C standard library: therefore, in these embodiments, the first three bytes would be prioritized for mutation. Resuming the ongoing exemplary analysis, under the newly generated policy the steps 406, 408, and 410 see the execution of the program fragment cover new program parts (line 15), make no new accesses to environmental information, and makes a previously unseen transient change to the state of the system with the network connection to "https://www.evilmalware.it". The new policy is annotated with the recorded coverage information and added to the queue at step 416 and is reported as significant at step 420. In this exemplary analysis it is showcased, among others, how the three types of coverage used in the methods from the present disclosure contribute as feedback to the identification of environment-sensitive behaviors of a program and to the altering of values that the program fragment is presented with when accessing items of environmental information. Due to the conciseness of the program fragment used for the exemplary analysis, it is also observed that no new coverage can be found if the operation at step 420 were to continue to step 402.

Hereafter, it is discussed an environment-sensitive program fragment that can impede existing techniques for analyzing environment-sensitive malware discussed as prior art; the program fragment can instead be analyzed using the methods from the present disclosure. The program fragment is representative of an environment-sensitive malware instance that searches for specific CPU 202 features and uses anti-analysis obfuscations on the search code. In particular, the malware instance targets low-power computing systems equipped with processors that support SSE2 vectorized instructions but do not support hyper-threading technology; one example of such processors is the Gemini Lake family of processors manufactured by Intel Corporation. For the sake of readability, the program fragment is expressed below in a C-like pseudocode instead of binary code:

```
1.    int cpuInfo[4];
2.    _cpuid(cpuInfo, 1);
3.    int mask=(1 << 26) + (1 << 28);
4.    int information = cpuInfo[3] & mask;
5.    int64_t obfuscated = 0;
6.    int i;
7.    for (i = 0; i < information; i++)
8.        if (i % 2 == 0) obfuscated += 3;
9.        else obfuscated -= 1;
10.   if (i % 2 != 0) obfuscated -= 2;
11.   int idx = obfuscated >> 22;
12.   void (*foo)( ) = arrayOfFunctionPointers[idx];
13.   foo( );
```

The program fragment can be compiled to a binary executable that runs on a computer system with an x86 or x86_64 CPU 202. The program fragment uses the "_cpuid" compiler intrinsic described earlier in this disclosure to query CPU 202 feature information, specifying "1" as first argument (as required by the specification of the "cpuid" instruction of x86 and x86_64 CPUs to query feature information) and the address of the output buffer "cpuInfo" as second argument. The CPU features that the program fragment is interested in are found in the last element of the "cpuInfo" buffer, which receives the value that "cpuid" writes to CPU register EDX; each bit in such value indicates the presence (1 value) or absence (0 value) of a specific CPU feature. More specifically, the program is interested in checking feature bits 26 and 28, where bits are counted from 0 to 31 starting with the least significant bit in the binary representation of the value. Feature bit 26 indicates whether the SSE2 vectorized instructions are supported. Feature bit 28 indicates whether the hyper-threading technology is supported. The program extracts the information it is interested in by applying at line 4 a bitmask to the whole feature value through a bitwise AND operation. The bitmask is variable "mask" assigned at line 3, where (1<<26) equals 4000000 h, (1<<28) equals 10000000 h, and the sum assigned as variable value equals 14000000 h. After the bitmask is applied at line 4, variable "information" can have one of the following values: 0 (both features unsupported), 4000000 h (only SSE2 vectorized instructions supported), 10000000 h (only hyper-threading technology supported), and 14000000 h (both features supported). However, this information is obfuscated by the program at lines 6-10 by using the FOR obfuscation described in [Ollivier et al. 2019], which copies the value of the "information" variable into a new variable named "obfuscated". The copy operation at lines 6-10 causes an explosion in the number of alternative program states (as high as the value of variable "information", that is, over 350 million states when the variable equals 14000000 h) to defeat multi-path exploration techniques such as symbolic execution. The copy operation at lines 6-10 also introduces implicit flows to hinder solutions based on taint analysis. At line 11, the program fragment makes a right-shift operation by 22 places on the covertly copied value; for the possible values listed above for the original variable "information", the corresponding values that variable "idx" would hold are 0, 10 h, 40 h, and 50 h, respectively. Variable "idx" is used at line 12 to retrieve a function pointer from a global array of function pointers that the program initialized before; the procedure is not detailed here for brevity. The array initialization code can optionally be protected with one or more obfuscation techniques [Banescu et al. 2018]. The array initialization code assigns all the array cells with pointers to one or more evasive code sequences (for example stalling sequences or early terminations) except for the cell with index 10 h, which is assigned with the address of a function that carries the (possibly malicious) actions of the program once its environmental expectations are met. A value 10 h can be seen for variable "idx" only if the feature information for the CPU sees the SSE2 vectorized instructions as supported and the hyper-threading technology as not. These characteristics are very unlikely to be found in solutions that build increasingly transparent analysis environments, neither as a default characteristic of the underlying hardware (for example, for solutions in the spirit of Ether and DRAKVUF) nor as predetermined false responses to common evasive patterns (for examples, for solutions in the spirit of Arancino and BluePill). Techniques from previous inventions cannot handle the program fragment either because the program analysis techniques they rely on for analyzing data values, branch and comparison instructions, and/or execution paths are impeded by the obfuscation constructs in place and because the program does not contain instructions that can be undergo brute-force modifications resulting in the address of the non-evasive function being retrieved at line 12, as in order for this to happen specific values must be present in the program's memory. The methods from the present disclosure can analyze the described program fragment by: detecting its access to the environmental information item produced by the "cpuid" instruction invoked by the compiler intrinsic "_cpuid"; creating an execution policy containing one or more rules that mutate the output of "cpuid", where such rules include one rule that flips bit 28 of the value that "cpuid" writes to register EDX (one mutation may already suffice as, on most current hardware suitable to realize the execution system 300, the normal course of operation would see bits 26 and 28 both equal to 1); executing the program fragment under such execution policy; identifying the new environment-sensitive behavior by the new internal coverage from executing the function selected by the "idx" variable having value 10 h at line 13 and, if any, by the externally observable actions from the execution of such function.

In the foregoing, the preferred embodiments have been described and variants of the present invention have been suggested, but it is to be understood that those skilled in the art will be able to make modifications and changes without thereby departing from the relative scope of protection, as defined by the claims attached.

The invention claimed is:

1. A method for analyzing an untrusted software program for potential environment-sensitive behavior, the method comprising the use of:

an execution monitor running on an execution system, the execution system including computer hardware and operating system, environmental information items, and having interposition capabilities;

a database of sets of information including rules and execution policies, the rules defining actions to be taken by the execution monitor when interposing on requests of access from a software program to said environmental information items, the database being accessible to said execution monitor;

the following steps being performed by the execution monitor:

A generating a new execution policy by means of random, coverage-guided fuzzing-style mutations of the rules in the execution policy, wherein the random, coverage-guided fuzzing-style mutations are made on the basis of said information about the actions recorded in the external coverage information to generate modifications to the rules in the execution policy, and wherein the new execution policy is set as the current execution policy;

B starting and monitoring an execution of the untrusted software program;

C interposing on accesses requested by the untrusted software program to one or more of the environmental information items;

D altering a response of the execution system to said requested accesses by taking the actions according to the current execution policy;

E recording, as external coverage information for guiding subsequent policy generation:

information about the actions invoked by the untrusted software program and regulated by the execution monitor under the current execution policy when accessing environmental information items; and information about possible transient and permanent changes done by the untrusted software program's execution to the execution system under the current execution policy;

F recording, as internal coverage information, information about internal program states, including code portions traversed by the untrusted software program's execution under the current execution policy, and data flows of the program, including values for input parameters when the program uses library functions or comparison instructions; and X1 selecting an execution policy from the database with internal and external coverage information from a previous execution of step E and F, or X2 setting an execution policy when there is no internal and external coverage information as defined in step E and F, and executing steps B-F before starting step A;

and wherein the following steps are carried out at the end of said execution of the untrusted software program:

G determining if the recorded internal and external coverage information for the current execution policy reveals novel information indicative of previously unobserved program states or actions, thereby providing feedback for adaptive policy generation compared to a plurality of prior executions of the untrusted software program;

H if step G determines no novel information, discarding the current policy, and starting again from steps X1 and X2;

I if step G determines novel information:

I1 saving said novel information into the current execution policy and updating the database by adding the current execution policy to it; and then I2 if step E detects no transient or permanent changes, performing again steps A-I; or I3 if step E detects transient and/or permanent changes, reporting to a user that an instance of environment-sensitive behavior has been revealed for the untrusted software program.

2. The method of claim 1, wherein the software program is a binary executable.

3. The method of claim 2, wherein dynamic binary instrumentation is used for steps B-F.

4. The method of claim 1, wherein accesses to environmental information items include one or more of: the invocation of operating system APIs for querying environmental information, the use of CPU instructions that provide direct access to environmental information, and direct accesses to shared-memory regions mapped in the process space of the program.

5. The method of claim 4, wherein the operating system APIs for querying environmental information are configured to access or check the existence of one or more of: files, processes, registry contents, hardware interfaces, timing sources, application windows, and configuration parameters of the operating system.

6. The method of claim 5, wherein a rule from an execution policy for an access to an environmental information item can prescribe one of: modifying the contents of the item before its retrieval by the program, denying the access, or forging a fake result for the access when it would be denied by the normal operation of the underlying execution system.

7. The method of claim 1, where external coverage information of step E include one or more of: attempted network communications, the creation or opening of inter-process communication objects, the creation, modification or removal of files, processes, application windows, and configuration parameters of the operating system.

8. The method of claim 1, wherein random, coverage-guided fuzzing-style mutations over the current execution policy can make one or more of the following: adding rules, deleting an existing rule, and modifying an existing rule in its data manipulation criteria.

9. The method of claim 8, wherein added and/or deleted and/or modified rules are based on the information about the actions invoked by the software program and regulated by the execution monitor of step E.

10. The method of claim 9, wherein added and/or deleted, and/or modified rules are additionally based on the internal coverage information, wherein the internal coverage information of step F includes the data flows from the software program as recorded when the program executes a code that compares strings or other byte sequences, wherein said code is a standard library function or one or more comparison instructions in the code of the untrusted software program.

11. The method of claim 1, wherein the information about transient and permanent changes of step E include one or more of: creation, modification or removal of files, processes, application windows, and configuration parameters of the operating system, where applicable, network communications attempts, and the creation or opening of temporary objects such as mutexes and other inter-process communication objects.

12. A system comprising:

a processor; and a memory communicatively coupled to the processor, the memory including:

an untrusted software program;

an execution monitor;

a database of execution policies;

wherein the execution monitor is configured to perform the following steps:

A generating a new execution policy by means of random, coverage-guided fuzzing-style mutations of the rules in the execution policy, wherein the random, coverage-guided fuzzing-style mutations are made on the basis of said information about the actions recorded in the external coverage information to generate modifications to the rules in the execution policy, and wherein the new execution policy is set as the current execution policy;

B starting and monitoring an execution of the untrusted software program;

C interposing on accesses requested by the untrusted software program to one or more of the environmental information items;

D altering a response of the execution system to said requested accesses by taking the actions according to the current execution policy;

E recording, as external coverage information for guiding subsequent policy generation: information about the actions invoked by the untrusted software program and regulated by the execution monitor under the current execution policy when accessing environmental information items; and information about possible transient and permanent changes done by the untrusted software program's execution to the execution system under the current execution policy;

F recording, as internal coverage information, information about internal program states, including code portions traversed by the untrusted software program's execution under the current execution policy, and data flows of the program, including values for input parameters when the program uses library functions or comparison instructions; and X1 selecting an execution policy from the database with internal and external coverage information from a previous execution of step E and F, or X2 setting an execution policy when there is no internal and external coverage information as defined in step E and F, and executing steps B-F before starting step A;

and wherein the following steps are carried out at the end of said execution of the untrusted software program:

G determining if the recorded internal and external coverage information for the current execution policy reveals novel information indicative of previously unobserved program states or actions, thereby providing feedback for adaptive policy generation compared to a plurality of prior executions of the untrusted software program;

H if step G determines no novel information, discarding the current policy, and starting again from steps X1 and X2;

I if step G determines novel information:

I1 saving said novel information into the current execution policy and updating the database by adding the current execution policy to it; and then I2 if step E detects no transient or permanent changes, performing again steps A-I; or I3 if step E detects transient and/or permanent changes, reporting to a user that an instance of environment-sensitive behavior has been revealed for the untrusted software program.

13. The method of claim 11, wherein the temporary objects are mutexes and other inter-process communication objects.

\* \* \* \* \*